United States Patent [19]

Klusener et al.

[11] Patent Number: 5,434,117
[45] Date of Patent: Jul. 18, 1995

[54] CATALYST SYSTEM AND COPOLYMERIZATION PROCESS

[75] Inventors: Peter A. A. Klusener; Hans A. Stil, both of Amsterdam, Netherlands

[73] Assignee: Shell Oil Company, Houston, Tex.

[21] Appl. No.: 167,689

[22] Filed: Dec. 15, 1993

[30] Foreign Application Priority Data

Dec. 15, 1992 [EP] European Pat. Off. ............ 92203936

[51] Int. Cl.$^6$ ...................... B01J 31/18; B01J 27/185
[52] U.S. Cl. .................................. 502/162; 502/155; 502/167; 502/170; 502/213
[58] Field of Search ............... 502/162, 170, 167, 155, 502/213

[56] References Cited

U.S. PATENT DOCUMENTS 5,116,797  5/1992  Rosenbrand et al. ............... 502/162

Primary Examiner—Sharon A. Gibson
Assistant Examiner—Timothy H. Meeks

[57] ABSTRACT

It is herein disclosed a novel catalyst systems comprising:

a) a source of cations of Group VIII metals, selected from palladium, cobalt and nickel;
b) a source of anions and
c) a source of bidentate ligands of the formula $$R^1R^2M^1-R-M^2R^3R^4$$

wherein each of $M^1$ and $M^2$ independently represents a phosphorus, arsenic, antimony or nitrogen atom, R represents a bivalent organic bridging group containing at least two atoms in the bridge and $R^1$, $R^2$, $R^3$ and $R^4$ independently represent substituted or non-substituted hydrocarbyl groups with the proviso that at least one of $R^1$, $R^2$, $R^3$ and $R^4$ represents an aryl group at least containing as substituents (i) at one or both ortho positions with respect to $M^1$ or $M^2$ to which the aryl group is linked, a hydrocarbyloxy group and (ii) at a meta position, adjacent to a substituted ortho position, a hydrocarbyl group or at the para position a halogen atom.

It is further disclosed a process for preparing copolymer comprising carbon monoxide and at least one ethylenically unsaturated hydrocarbon by reacting the monomers under polymerization conditions in the presence of the novel catalyst systems.

18 Claims, No Drawings

CATALYST SYSTEM AND COPOLYMERIZATION PROCESS

BACKGROUND OF THE INVENTION

The invention relates to novel catalyst systems that may be used in a process for the preparation of copolymers of carbon monoxide and one or more ethylenically unsaturated compounds.

Copolymers of carbon monoxide and one or more ethylenically unsaturated compounds are known. Typically they have a high molecular weight and a linear structure. In the copolymer molecules the units originating from carbon monoxide substantially alternate with the units originating from the ethylenically unsaturated compound(s). If the copolymer molecules comprise units derived from different ethylenically unsaturated compounds (A,B ... etc.), these units which alternate with the units derived from carbon monoxide, are also usually randomly distributed over the copolymer molecule.

Various methods for preparing the said copolymers have been described in the art. These methods generally involve reacting the monomers, i.e. carbon monoxide and the ethylenically unsaturated compound(s) under polymerization conditions in the presence of a suitable catalyst system.

Much effort has been put into the development of active catalyst systems in order to ensure that the copolymers are formed at a high polymerization rate. Furthermore, it is considered desirable to produce copolymers with a high molecular weight, in view of the envisaged uses for the copolymers. Therefore it was investigated which reaction conditions would be advantageous in these respects and which other factors could influence the polymerization rate and/or the molecular weight of the copolymers produced. One of the reaction variables considered likely to be of significance is the reaction temperature. It has been observed that the temperature at which the polymerization is carried out, affects the activity of the catalyst system, as well as the molecular weight of the copolymers obtained. Unfortunately, the effect a certain change in reaction temperature has on the activity of the catalyst system is opposite to the effect this change has on the molecular weight of the copolymers produced. Thus, an increase in reaction temperature under otherwise similar reaction conditions, results in an increase in polymerization rate, but in a decrease in the molecular weight of the copolymer obtained.

Another factor of relevance for obtaining high polymerization rates is the structure of the components on which the catalyst system is based. It has been established that active catalyst systems usually are based on compounds of metals of Group VIII of the Periodic Table, on a source of anions and on bidentate ligands.

In this connection many bidentate ligands were investigated, whereby favorable results were obtained with ligands which can be defined by the formula $R^1R^2M^1-R-M^2R^3R^4$ wherein $R^1$, $R^2$, $R^3$ and $R^4$ represent optionally substituted hydrocarbyl groups, $M^1$ and $M^2$ represent atoms of elements of Group VA of the Periodic Table and R is a bivalent bridging group.

In EP-A-222454 it is disclosed that the performance of catalysts comprising a bidentate ligand of this category, is enhanced if at least one of the groups $R^1$, $R^2$, $R^3$ and $R^4$ represents an aryl group containing a polar substituent at the position, para to $M^1$ or $M^2$. Further research has shown that the performance of the catalyst can be further enhanced by incorporating a bidentate ligand wherein at least one of the $R^1$ to $R^4$ groups represents an aryl group containing a polar substituent in a position ortho to a phosphorus atom which is represented by $M^1$ and $M^2$. The improved catalytic performance can be experimentally demonstrated by comparing the results obtained with 2-methoxy and 2,4-dimethoxyphenyl groups in the bidentate ligands with the results obtained with 4-methoxyphenyl and non-substituted phenyl groups in the bidentate ligand.

Surprisingly it has now been found that the performance of the catalyst can be further improved by using a catalyst system based on bidentate ligands of the aforesaid category, which contain one or more aryl groups, i.e. $R^1 \ldots R^4$, carrying specific substituents at one or both ortho positions and also at a meta or para position, with respect to $M^1$ or $M^2$.

SUMMARY OF THE INVENTION

The invention may be defined as relating to novel catalyst systems comprising:
a) a source of cations of Group VIII metals, selected from palladium, cobalt and nickel;
b) a source of anions and
c) a source of bidentate ligands of the formula $$R^1R^2M^1-R-M^2R^3R^4 \tag{I}$$

wherein each of $M^1$ and $M^2$ independently represents a phosphorus, arsenic, antimony or nitrogen atom, R represents a bivalent organic bridging group containing at least two atoms in the bridge and $R^1$, $R^2$, $R^3$ and $R^4$ independently represent substituted or non-substituted hydrocarbyl groups with the proviso that at least one of $R^1$, $R^2$, $R^3$ and $R^4$ represents an aryl group containing as substituents at least (i) at one or both ortho positions with respect to $M^1$ or $M^2$ to which the aryl group is linked, a hydrocarbyloxy group, and (ii) at a meta position, adjacent to a substituted ortho position, a hydrocarbyl group or at the para position a halogen atom.

DETAILED DESCRIPTION OF THE INVENTION

Catalyst systems in which as component (a), a source of palladium cations is used, are preferred. As source of cations of Group VIII metals a salt of the relevant metal, particularly a salt of a carboxylic acid such as acetic acid, propionic acid, a haloacetic acid or citric acid can be used. Examples of suitable metal salts are palladium acetate, nickel acetate and palladium trifluoroacetate.

Suitable sources of anions include acids having a pKa of less than 4 (determined in aqueous solution at 18° C.), and preferably of less than 2 and salts of such acids. In view of their corrosive properties, hydrohalogenic acids and salts thereof are not recommended. Examples of suitable anion sources are sulfonic acids such as methanesulfonic acid and para-toluenesulfonic acid, haloacetic acids such as trifluoroacetic acid and salts of non-noble transition metals such as copper (II) acetate. If desired, the source of anions may be combined with the source of cations of Group VIII metals in a single compound. An example is the complex $Pd(CH_3CN)_2(O_3S-C_6H_4-CH_3)_2$, obtainable by the reaction of palladium acetate and para-toluenesulfonic acid in acetonitrile.

In the bidentate ligands of formula (I) $M^1$ and $M^2$ may be similar or different, but preferably they are similar and both represent phosphorus atoms. The bivalent organic bridging group R is preferably an alkylene group, or an alkylene group interrupted by one or more atoms other than carbon, such as oxygen, sulphur or silicon atoms. Preferably R contains from 2 to 5, more preferably 3 carbon atoms in the bridge. Examples of suitable R groups include: —$CH_2$—$CH_2$—; —$CH_2$—$CH_2$—$CH_2$—; —$CH_2$—O—$CH_2$—; —$CH_2$—Si($CH_3$)$_2$—$CH_2$—; —$CH_2$—$CH_2$—$CH_2$—$CH_2$— and —$CH_2$—$CH_2$—O—$CH_2$—$CH_2$—. In the bidentate ligands of formula (I) at least one of $R^1$, $R^2$, $R^3$ and $R^4$ represents an aryl group containing the substituents as further disclosed in the specification. Preferably, the substituted aryl groups are substituted phenyl groups.

According to the invention the substituted aryl groups represented by at least one of the groups $R^1$ to $R^4$ contain a hydrocarbyloxy group at one or both ortho-positions with respect to $M^1$ or $M^2$ to which the aryl group is linked. The hydrocarbyloxy group may be an aryloxy group such as a phenoxy group or a tolyloxy group, or an alkoxy group, preferably an alkoxy group with from 1 to 4 carbon atoms, for example a methoxy, ethoxy or butoxy group. Preferably, the aryl group contains a methoxy group at one or both ortho-positions. The substituted aryl groups represented by at least one of $R^1$ to $R^4$ contain in addition to the substituent(s) at the ortho-position(s), a hydrocarbyl group at a meta-position adjacent to a substituted ortho-position, or a halogen atom at the para-position. In the event that a substituent is present at the said meta-position, this is preferably a hydrocarbyl group having from 1 to 8 carbon atoms. Examples of suitable hydrocarbyl substituents are methyl, ethyl, isopropyl, phenyl and tolyl groups.

Preferred are substituted aryl groups wherein the hydrocarbyl moiety in the hydrocarbyloxy group at an ortho-position at the same time constitutes the hydrocarbyl substituent at the adjacent meta-position. In these substituted aryl groups, a bivalent organic moiety (—O—X—, wherein X represents hydrocarbyl) is present, which, together with two adjacent carbon atoms of the aryl group in ortho- and meta-position, respectively, will form a cyclic structure. Preferred examples of substituted aryl groups of this category are dihydrobenzofuranyl and dibenzofuranyl groups. Bisphosphines having the general formula

$(R^1)_2P$—R—$P(R^1)_2$ (II)

wherein R is an alkylene group having 2 to 5 carbon atoms and $R^1$ is a dibenzofuranyl-1 group or a 2,3-dihydro-7-benzofuranyl group, are novel compounds.

In the event that the substituted aryl groups represented by at least one of $R^1$ to $R^4$ contain, in addition to the substituent(s) at the ortho-position(s), a halogen atom at the para-position, this preferably can be a chlorine or bromine atom. A chlorine atom is particularly preferred.

If desired, the substituted aryl groups may contain an additional substituent at the other meta-position, preferably a lower alkyl group such as a methyl- or ethyl group. Examples of preferred halogen substituted aryl groups are 2-methoxy-4-chlorophenyl groups and 2-methoxy-4-chloro-5-methylphenyl groups. It is preferred to use bidentate ligands whereby $R^1$, $R^2$, $R^3$ and $R^4$ are similar.

In order to further enhance the activity of the catalyst systems of the invention, it is advantageous to incorporate in the reaction mixture one or more promoters. Suitable promoters include organic oxidant promoters, in particular promoters selected from the group consisting of benzoquinones, naphthoquinones and anthraquinones. The quantity of promoters to be used is generally in the range of from 10–1000 mol and preferably in the range of from 25–500 mol per gram atom of Group VIII metal.

In the catalyst systems of the invention the quantity of component (b) is generally in the range of from 0.5 to 200 and preferably from about 1.0 to 100 equivalents per gram atom of Group VIII metal. The bidentate ligand is typically applied in an amount of from 0.1 to 2 and preferably in an amount of from 0.75 to 1.5 mol per gram atom of Group VIII metal.

The invention further relates to the use of the catalyst systems in a process for preparing copolymers of carbon monoxide and one or more ethylenically unsaturated compounds, to copolymers thus prepared and to shaped objects at least partly consisting of these copolymers.

In the process of preparing the copolymers, the amount in which the catalyst system is used may vary within wide limits. In general, amounts are used such that per mol of ethylenically unsaturated compound to be polymerized, $10^{-7}$ to $10^{-2}$ gram atom of Group VIII metal is present. Preferably the catalyst system is used in an amount within the range of from $10^{-6}$ to $10^{-4}$ gram atom of Group VIII metal per mol of ethylenically unsaturated compound.

Suitable ethylenically unsaturated compounds include compounds exclusively consisting of carbon and hydrogen atoms and compounds comprising in addition other atoms such as oxygen or nitrogen atoms. Examples of suitable monomers are lower olefins, such as ethene, propene, butene-1, (alk)aryl substituted olefins, such as styrene and p-methylstyrene and unsaturated esters, such as vinyl acetate and methyl acrylate.

Lower olefins monomers particularly ethene and a mixture of ethene and propene are preferred. The copolymerization reaction is preferably carried out in the presence of a liquid diluent. Examples of suitable diluents are alcohols, such as methanol, ethanol and isopropanol, and ketones such as acetone and methylethylketone. If desired, the reaction may also be carried out in the gaseous phase.

The monomers, viz. carbon monoxide on the one hand and the ethylenically unsaturated compound(s) on the other hand are conveniently applied in a molar ratio between 5:1 and 1:5, although ratios outside this range are not excluded. Preferably, substantially equimolar amounts are used. The reaction is carried out at a temperature in the range of from 30° to 150° C., particularly in the range of from 70° to 110° C.

Preferred pressures are in the range of from 20° to 200° bar, particularly in the range of from 40 to 100 bar. By using the inventive catalyst systems a high reaction rate is achieved. The copolymers thus obtained have a sufficiently high molecular weight to make them suitable as premium thermoplastics for fibers or films, or for injection molding, compression molding or blowing applications. They may be used for many applications such as in the car industry, for the manufacturing of packaging materials for foods and drinks, as insulating material in the production of cables, and for various applications in the domestic sphere.

Because the inventive copolymers have higher molecular weights, their intrinsic viscosities as a rule will also be higher. In order to determine the intrinsic viscosity of a copolymer, e.g. a copolymer prepared according to the invention, solutions are prepared by dissolving the copolymer in different concentrations in m-cresol. The intrinsic viscosity can be calculated from the determined viscosity values and is expressed in dl/g. It is hereinafter sometimes referred to as "Limiting Viscosity Number" (LVN). The LVN value of the copolymers of the invention is usually in the range of from 0.2 to 5.0 dl/g.

The invention is further illustrated by the following examples.

Example 1

A carbon monoxide/ethene copolymer was prepared as follows. A mechanically stirred autoclave of 150 ml capacity was charged with 74 ml of methanol. The air present in the autoclave was removed therefrom by pressurizing the autoclave with an equimolar mixture of carbon monoxide and ethene to 40 bar and then releasing the pressure. This procedure was repeated twice.

After the contents of the autoclave had been brought to a temperature of 96° C., an equimolar mixture of carbon monoxide and ethene was introduced until the pressure was 55 bar. Subsequently a catalyst solution was introduced consisting of 0.039 mmol of palladium (II) acetate, 0.088 mmol of p-toluenesulfonic acid and 0.041 mmol of 1,3-bis[bis(2-methoxy-4-chlorophenyl)-phosphino]propane in 6 ml of acetone. During the reaction period of 0.75 hours the pressure and temperature remained constant.

The reaction was discontinued by cooling the reaction mixture to room temperature and releasing the pressure.

The solid product was filtered off and dried. The copolymer yield was 10.13 g, and had an LVN (determined at 60° C.) of 1.06. The reaction rate was 3.3 kg copolymer per g palladium and per hour.

Example 2

A carbon monoxide/ethene copolymer was prepared substantially as described in Example 1 with the following differences:
i) the autoclave (250 ml) was charged with 171 ml of methanol, instead of 74 ml; and 3.16 mmol of naphthoquinone
ii) the catalyst solution contained 0.009 mmol of palladium (II) acetate, 0.021 mmol of p-toluenesulfonic acid, 0.009 mmol of 1,3-bis[bis(2-methoxy-4-chlorophenyl)phosphino]propane in 4 ml of acetone;
iii) the reaction period was 1.38 hours, instead of 0.75 hour.

The copolymer yield was 19.2 g. This copolymer had an LVN (determined at 60° C.) of 0.85 dl/g. The reaction rate was 14.6 kg copolymer per g palladium and per hour.

Example 3

A carbon monoxide/ethene copolymer was prepared substantially as described in Example 2 with the following differences:
i) the catalyst solution contained 0.010 mmol of 1,3-bis[bis(2-methoxy-4-chloro-5-methylphenyl)phosphino]propane, instead of 0.009 mmol of 1,3-bis[bis(methoxy-4-chlorophenyl)phosphino]propane;
ii) the reaction period was 1.02 hour, instead of 1.38 hours.

The copolymer yield was 20.45 g and had an LVN (determined at 60° C.) of 0.62 dl/g. The reaction rate was 21.0 kg copolymer per g palladium and per hour.

Example A (for comparison)

A carbon monoxide/ethene copolymer was prepared, substantially as described in Example 1, with the following differences:
i) the autoclave (250 ml) was charged with 171 ml of methanol, instead of 74 ml;
ii) the catalyst solution contained 0.010 mmol of palladium (II) acetate, 0.023 mmol of p-toluenesulfonic acid and 0.010 mmol of 1,3-bis[bis(2-methoxyphenyl)phosphino]propane in 4 ml of acetone;
iii) the reaction period was 1.20 hours, instead of 0.75 hour.

The copolymer yield was 5.02 g and had an LVN (determined at 60° C.) of 0.87 dl/g. The reaction rate was 3.9 kg copolymer per g palladium and per hour.

Example B (for comparison)

A carbon monoxide/ethene copolymer was prepared, substantially as described in Example 3, with the difference that the catalyst solution contained 0.022 mmol of p-toluenesulfonic acid, instead of 0.021 mmol and 0.010 mmol of 1,3-bis[bis(2-methoxyphenyl)phosphino]propane, instead of 1,3-bis[bis(2-methoxy-4-chloro-5-methylphenyl)phosphino]propane.

The copolymer yield was 20.8 g and had an LVN (determined at 60° C.) of 0.59 dl/g. The reaction rate was 21.4 kg copolymer per g palladium and per hour.

Example C (for comparison)

A carbon monoxide/ethene copolymer was prepared, substantially as described in Example 3, with the following differences:
i) the autoclave was charged with 200 ml of methanol, instead of 171 ml;
ii) the catalyst solution consisted of 0.01 mmol of palladium (II) acetate, 0.2 mmol of trifluoroacetic acid, 0.012 mmol of 1,3-bis[bis(2-methoxyphenyl)phosphino]propane and 2 mmol of 1,4-benzoquinone in 6 ml of methanol;
iii) the reaction period was 3 hours, instead of 1.02 hours.

The copolymer yield was 40.3 g and had an LVN of 0.96 dl/g (determined in m-cresol at 100° C., was 40.3 g. The reaction rate was 12.7 kg copolymer per g palladium and per hour.

Example D (for comparison)

A carbon monoxide/ethene copolymer was prepared, substantially as described in Example 1, with the following differences:
i) the autoclave (250 ml) was charged with 200 ml of methanol, instead of 74 ml;
ii) the temperature was 85° C., instead of 95° C.;
iii) the catalyst solution consisted of 0.02 mmol of palladium (II) acetate, 0.04 mmol of p-toluenesulfonic acid and 0.02 mmol of 1,3-bis[bis(4-chlorophenyl)phosphino]propane in 6 ml of methanol;
iv) the reaction period was 3 hours, instead of 0.75 hour.

The copolymer yield was 22.8 g and had an LVN (determined in m-cresol at 100° C.) of 0.22 dl/g. The reaction rate was 3.6 kg copolymer per g palladium and per hour.

Example E (for comparison)

A carbon monoxide/ethene copolymer was prepared, substantially as described in Example D, with the differences that the temperature was 96° C. and that the catalyst solution contained 0.02 mmol of 1,3-bis[bis(2-methoxy-5-methylphenyl)phosphino]propane, instead of 1,3-bis[bis(4-chlorophenyl)phosphino]propane.

The copolymer yield was 36.2 g and had an LVN (determined in m-cresol at 100° C.) of 0.55 dl/g. The reaction rate was 5.7 kg copolymer per g palladium and per hour.

Example F (for comparison)

A carbon monoxide/ethene copolymer was prepared, substantially as described in Example C, with the following differences
 i) the autoclave was charged with 150 ml of methanol, instead of 200 ml;
 ii) the pressure was 50 bar, instead of 55 bar;
 iii) the catalyst solution contained 0.024 mmol 1,3-bis[bis(2,4-dimethoxyphenyl)phosphino]propane, instead of 0.012 mmol of 1,3-bis[bis(2-methoxyphenyl)phosphino]propane.

The copolymer yield was 16.2 g and had an LVN (determined in m-cresol at 100° C.) of 1.1 dl/g. The reaction rate was 5.1 kg copolymer per g palladium and per hour.

Example 4

A carbon monoxide/ethene copolymer was prepared, substantially as described in Example 1, with the following differences:
 i) the catalyst solution consisted of 0.019 mmol of palladium (II) acetate, 0.037 mmol of p-toluenesulfonic acid and 0.020 mmol 1,3-bis[bis(1-dibenzofuranyl)phosphino]propane in 4 ml of acetone;
 ii) the reaction period was 1.92 hour, instead of 0.75 hour.

The yield of copolymer, which had an LVN (determined at 60° C.) of 0.91 dl/g, was 1.80 g. The reaction rate was 0.47 kg per g palladium and per hour.

Example 5

A carbon monoxide/ethene copolymer was prepared, substantially as described in Example 4, with the following differences:
 i) the autoclave (250 ml) was charged with 173 ml of methanol, instead of 76 ml and 3.16 mmol of naphthoquinone;
 ii) the catalyst solution consisted of 0.009 mmol of palladium (II) acetate, 0.022 mmol of p-toluenesulfonic acid, 0.010 mol of 1,3-bis[bis(1-dibenzofuranyl)phosphino]propane in 4 ml of acetone;
 iii) the reaction period was 3.12 hour, instead of 1.92 hours.

The copolymer yield was 16.55 g and had an LVN (determined at 60° C.) of 0.64 dl/g. The reaction rate was 5.6 kg copolymer per g palladium and per hour.

Example 6

A carbon monoxide/ethene copolymer was prepared, substantially as described in Example 4, with the following differences:
 i) the catalyst solution contained 0.040 mmol of p-toluene-sulfonic acid, instead of 0.037 mmol and 0.020 mmol of 1,3-bis]bis(2,3-dihydro-7-benzofuranyl)phosphino]propane instead of 1,3-bis[bis(1-dibenzofuranyl)phosphino]propane;
 ii) the reaction period was 0.73 hour, instead of 1.92 hours.

The copolymer yield was 9.99 g and had an LVN (determined at 60° C.) of 0.78 dl/g. The reaction rate was 6.8 kg copolymer per g palladium and per hour.

Example 7

A carbon monoxide/ethene copolymer was prepared, substantially as described in Example 3, with the following differences:
 i) the catalyst solution contained 0.009 mmol of 3-bis[bis(2,3-dihydro-7-benzofuranyl)phosphino]propane, instead of 0.010 mmol of 1,3-bis[bis(2-methoxy-4-chloro-5-methylphenyl)-phosphino]propane;
 ii) the reaction period was 1.48 hours, instead of 1.02 hours.

The copolymer yield was 20.52 g and had an LVN (determined at 60° C.) of 0.71 dl/g. The reaction rate was 14.5 kg copolymer per g palladium and per hour.

With the aid of $^{13}C$-NMR spectrometry it was established that the carbon monoxide/ethene copolymers prepared according to Examples 1–7 and comparative Examples A–F had a linear structure and consisted of units of $-CO-(C_2H_4)-$.

Comparison of the results obtained in Example 1 and Example A shows that using a catalyst system according to the invention leads to the formation of a product with a higher LVN. The favorable effect of using a catalyst system comprising a bidentate ligand according to the invention, was also apparent by comparing the results of the experiment of Example B with those of the experiments described in Examples 2 and 3, which were carried out with a promoter in the catalyst system. Although the reaction rate in the comparative example is high, the LVN of the copolymer is significantly lower than the LVN values of the products obtained in Examples 2 and 3.

Comparing the results of Example C with those of Examples 2 and 3 also demonstrates that using the catalyst systems of the invention results in a higher reaction rate, at comparable LVN values.

The use of a catalyst containing the bidentate ligand, according to Examples D and E leads to inferior results.

Comparing the results of Example F with those of Examples 2 and 3, demonstrates that in the comparative experiment a somewhat higher LVN value prevails, but that a considerably higher reaction rate is achieved with the catalyst systems of the invention.

While this invention has been described in detail for the purpose of illustration, it is not to be construed as limited thereby but is intended to cover all changes and modifications within the spirit and scope thereof.

What is claimed is:

1. A catalyst system comprising:
 a) a source of cations of Group VIII metals, selected from the group consisting of palladium, cobalt and nickel;
 b) a source of anions and
 c) a source of bidentate ligands of the formula

$$R^1R^2M^1-R-M^2R^3R^4 \qquad (I)$$

wherein each of $M^1$ and $M^2$ independently represents a phosphorus, arsenic, antimony or nitrogen atom, R represents a bivalent organic bridging group containing at least two atoms in the bridge and $R^1$, $R^2$, $R^3$ and $R^4$ independently represent hydrocarbyl groups with the proviso that at least one of $R^1$, $R^2$, $R^3$ and $R^4$ represents an aryl group containing as substituents at least (i) at one or both ortho positions with respect to $M^1$ or $M^2$ to which the aryl group is linked, a hydrocarbyloxy group and (ii) at a meta position, adjacent to a substituted ortho position, a hydrocarbyl group.

2. A catalyst system as in claim 1 wherein the source of palladium cations is a salt of a carboxylic acid.

3. A catalyst system as in claim 2 wherein said carboxylic acid is acetic acid.

4. A catalyst system as in claim 1 wherein the source of anions is a non-hydrohalogenic acid with a pKa of less than 4.

5. A catalyst system as in claim 4 wherein the acid has a pKa of less than 2.

6. A catalyst system as in claim 1 wherein in the bidentate ligands of formula (I), $M^1$ and $M^2$ both represent phosphorus atoms.

7. A catalyst system as in claim 1 wherein in the bidentate ligands of formula (I), R represents a bivalent organic bridging group containing from 2 to 5 carbon atoms in the bridge.

8. A catalyst system as in claim 7 wherein R contains 3 carbon atoms in the bridge.

9. A catalyst system as in claim 1 wherein in the bidentate ligands of formula (I) the aryl group of at least one of $R^1$, $R^2$, $R^3$ and $R^4$ represents a phenyl group.

10. A catalyst system as in claim 9 wherein in the bidentate ligands of formula (I) at least one of $R^1$, $R^2$, $R^3$ and $R^4$ represents an ortho-alkoxyphenyl group.

11. A catalyst system as in claim 10 wherein the alkoxy group is a methoxy group.

12. A catalyst system as in claim 1 wherein in at least one of $R^1$, $R^2$, $R^3$ and $R^4$ the hydrocarbyl moiety in the hydrocarbyloxy group at an ortho position constitutes the hydrocarbyl group at the adjacent meta position.

13. A catalyst system as in claim 1 wherein at least one of $R^1$, $R^2$, $R^3$ and $R^4$ represents a dibenzofuranyl group.

14. A catalyst system as in claim 1 wherein at least one of $R^1$, $R^2$, $R^3$ and $R^4$ represents a dihydrobenzofuranyl group.

15. A catalyst system as in claim 1 wherein at least one of $R^1$, $R^2$, $R^3$ and $R^4$ represents an ortho-methoxy-para-chloro-meta-methylphenyl group.

16. A catalyst system as in claim 1 wherein the bidentate ligands of formula (I), $R^1$, $R^2$, $R^3$ and $R^4$ represent similar groups.

17. A catalyst system as in claim 1 comprising a promoter selected from the group consisting of benzoquinones, naphthoquinones and anthraquinones.

18. A catalyst system as in claim 1 wherein the amount of component (b) is in the range of from 1.0 to 100 equivalents per gram atom of Group VIII metal, and the amount of component (c) is in the range of from 0.75 to 1.5 mol per gram atom of Group VIII metal.

* * * * *